(12) United States Patent
Wong et al.

(10) Patent No.: US 10,782,940 B2
(45) Date of Patent: Sep. 22, 2020

(54) CODE LIBRARY VERSION MANAGEMENT

(71) Applicant: International Business Machines Corporation, Armonk, NY (US)

(72) Inventors: Chih-Hong Wong, Beijing (CN); Cheng-Wei Chiang, Beijing (CN); Juan Liu, Beijing (CN); Dan Qing Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/162,498

(22) Filed: Oct. 17, 2018

(65) Prior Publication Data

US 2020/0125339 A1 Apr. 23, 2020

(51) Int. Cl.
*G06F 9/44* (2018.01)
*G06F 8/36* (2018.01)
*G06F 8/71* (2018.01)

(52) U.S. Cl.
CPC .  *G06F 8/36* (2013.01); *G06F 8/71* (2013.01)

(58) Field of Classification Search
CPC ........................................ G06F 8/36
USPC ........................................ 717/120
See application file for complete search history.

(56) References Cited

U.S. PATENT DOCUMENTS

| 7,873,958 | B2 | 1/2011 | Wiltamuth et al. |
| 8,788,569 | B2 | 7/2014 | Griffiths et al. |
| 9,348,582 | B2 | 5/2016 | Pillgram-Larsen et al. |
| 9,558,017 | B2 | 1/2017 | Plate |

FOREIGN PATENT DOCUMENTS

CN 106033336 A 10/2016

OTHER PUBLICATIONS

TutorialsPoint, "Maven Manage Dependencies", Jun 14, 2016, https://web.archive.org/web/20160614030039/https://www.tutorialspoint.com/maven/maven-manage_dependencies.htm (Year: 2016).*
Eric Bruneton, "ASM 4.0 A Java bytecode engineering library", Sep. 2011, pp. 1-11 (Year: 2011).*
Tsai, B. "How to resolve dependency conflict out of your control", Apr. 4, 2017, 6 pages. https://bryantsai.com/how-to-resolve-dependency-conflict-out-of-your-control-e75ace79e54f.
Unknown, "Versions Maven Plugin", Last Published Sep. 6, 2018, 3 pages http://www.mojohaus.org/versions-maven-plugin/.

(Continued)

*Primary Examiner* — Wei Y Zhen
*Assistant Examiner* — Lanny N Ung
(74) *Attorney, Agent, or Firm* — Nathan M. Rau

(57) ABSTRACT

Embodiments of the present disclosure can be used to provide version management for a code library. Groups of objects called in a first code library and a second code library can be obtained. The first code library and the second code library are referred to in an application project, and the groups of objects are defined in multiple versions of a base library. Sets of versions of the base library can be determined, where the first group of objects are defined in the first set of versions of the base library, and the second group of objects are defined in the second set of versions of the base library. Based on the versions of the base library, a candidate version of the base library can be identified for being referred to in the application project.

15 Claims, 11 Drawing Sheets

(56) References Cited

OTHER PUBLICATIONS

Unknown, "Maven Dependency Version Conflict Problem and Resolution", Aug. 2, 2013, 3 pages.
Jose Manuel Garcia Maestre, "Solving Dependency Conflicts in Maven", DZone/Java Zone, Aug. 18, 2017, 11 pages.
Varanasi, B., "Dependency Management", Introducing Gradle, Abstract Only, Copyright 2017, 2 pages.
Mell et al., "The NIST Definition of Cloud Computing", Recommendations of the National Institute of Standards and Technology, Sep. 2011, 7 pages.

* cited by examiner

```
<project xmlns="http://maven.apache.org/POM/4.0.0"
xmlns:xsi="http://www.w3.org/2001/XMLSchema-
instance"
xsi:schemaLocation="http://maven.apache.org/POM/
4.0.0
http://maven.apache.org/maven-v4_0_0.xsd">
  <modelVersion>4.0.0</modelVersion>
  <groupId>org.sonatype.mavenbook.ch03</groupId>
  <artifactId>simple</artifactId>
  <packaging>jar</packaging>
  <version>1.0-SNAPSHOT</version>
  <name>simple</name>
  <url>http://maven.apache.org</url>
  <dependencies>
    <dependency>
      <groupId>junit</groupId>
      <artifactId>junit</artifactId>
      <version>3.8.1</version>
      <scope>test</scope>
    </dependency>
    ...
  </dependencies>
</project>
```

| 810A |
|---|
| Modifiers, name, super class, interfaces |
| Constant pool: numeric, string and type constants |
| Source file name (optional) |
| Enclosing class reference |
| Annotation* |
| Attribute* |

| Inner class* | Name | 820A |
|---|---|---|
| Field* | Modifiers, name, type | |
| | Annotation* | |
| | Attribute* | 830A |
| Method* | Modifiers, name, return and parameter types | |
| | Annotation* | |
| | Attribute* | |
| | Compiled code | |

| 810B |
|---|
| Modifiers, name, super class, interfaces |
| Constant pool: numeric, string and type constants |
| Source file name (optional) |
| Enclosing class reference |
| Annotation* — 820B |
| Attribute* |

| Inner class* | Name | |
|---|---|---|
| Field* | Modifiers, name, type — 830B | 840B |
| | Annotation* | |
| | Attribute* | 850B |
| Method* | Modifiers, name, return and parameter types | |
| 860B | Annotation* | |
| | Attribute* — 870B | |
| | Compiled code | |

FIG. 8B

```
< project xmlns =" http :// maven . apache . org / POM /4.0.0 "    ~1110
    < dependencies >                                              ~1120
    ...
    < dependency >
        < groupId > junit </ groupId >
        < artifactId > junit </ artifactId >
        < version >3.8.1</ version >                              ~1130
        < runWith >3.7,3.8,3.8.1,3.8.2,4.0</ runWith >
        < scope > test </ scope >
    </ dependency >
    ...
</ dependencies >
...
```

FIG. 11

CODE LIBRARY VERSION MANAGEMENT

BACKGROUND

The present disclosure generally relates to software management. Specifically, the present disclosure relates to methods, systems and products used for version management for a code library used within in an application project.

In accordance with computer software technology developments and evolution, a large number of code libraries for implementing basic functions can be used within in a software development process. In developing an application project, engineers often refer to several code libraries, which can be either free or commercially available, and call objects defined within those code libraries. There can be direct or indirect dependencies between the code libraries referred to in the application projects.

SUMMARY

Embodiments may be directed towards a computer-implemented method. The method can include obtaining a first group of objects and a second group of objects that are called in a first code library and in a second code library, respectively. The first code library and the second code library can be referred to in an application project, and the first group of objects and the second group of objects can be defined in multiple versions of a base library. The method can include determining a first set of versions and a second set of versions of the base library, where the first group of objects are defined in the first set of versions of the base library and the second group of objects are defined in the second set of versions of the base library. The method can also include identifying a candidate version of the base library for being referred to in the application project based on the first set of versions and the second set of versions of the base library.

Embodiments may be directed towards an electronic system. The electronic system can include a computer processor coupled to a non-transitory computer-readable memory unit, the memory unit comprising instructions that when executed by the computer processor implement a method. The method can include obtaining a first group of objects and a second group of objects that are called, respectively, in a first code library and a second code library. The first code library and the second code library can be referred to in an application project, and the first group of objects and the second group of objects can be defined in multiple versions of a base library. The method can also include determining a first set of versions and a second set of versions of the base library. The first group of objects can be defined in the first set of versions of the base library and the second group of objects can be defined in the second set of versions of the base library. The method can also include identifying, based on the first set of versions and the second set of versions of the base library, a candidate version of the base library for being referred to in the application project.

Embodiments may also be directed towards a computer program product. The computer program product can include a computer-readable non-transitory storage medium having program instructions embodied therewith. The program instructions can be executable by an computer processor circuit to cause the computer processor circuit to perform a method. The method can include obtaining a first group of objects and a second group of objects that are called, respectively, in a first code library and in a second code library. The first code library and the second code library can be referred to in an application project, and the first group of objects and the second group of objects can be defined in multiple versions of a base library. The method can also include determining a first set of versions and a second set of versions of the base library. The first group of objects can be defined in the first set of versions of the base library and the second group of objects can be defined in the second set of versions of the base library. The method can also include identifying, based on the first set of versions and the second set of versions of the base library, a candidate version of the base library for being referred to in the application project.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example diagram for a configuration that can be used, according to embodiments consistent with the figures.

FIGS. 8A and 8B depict example block diagrams of fragments of bytecodes related to a class from which a group of objects can be obtained, according to embodiments consistent with the figures.

FIG. 11 depicts an example diagram for a configuration that is modified, according to embodiments consistent with the figures.

Figure 1:
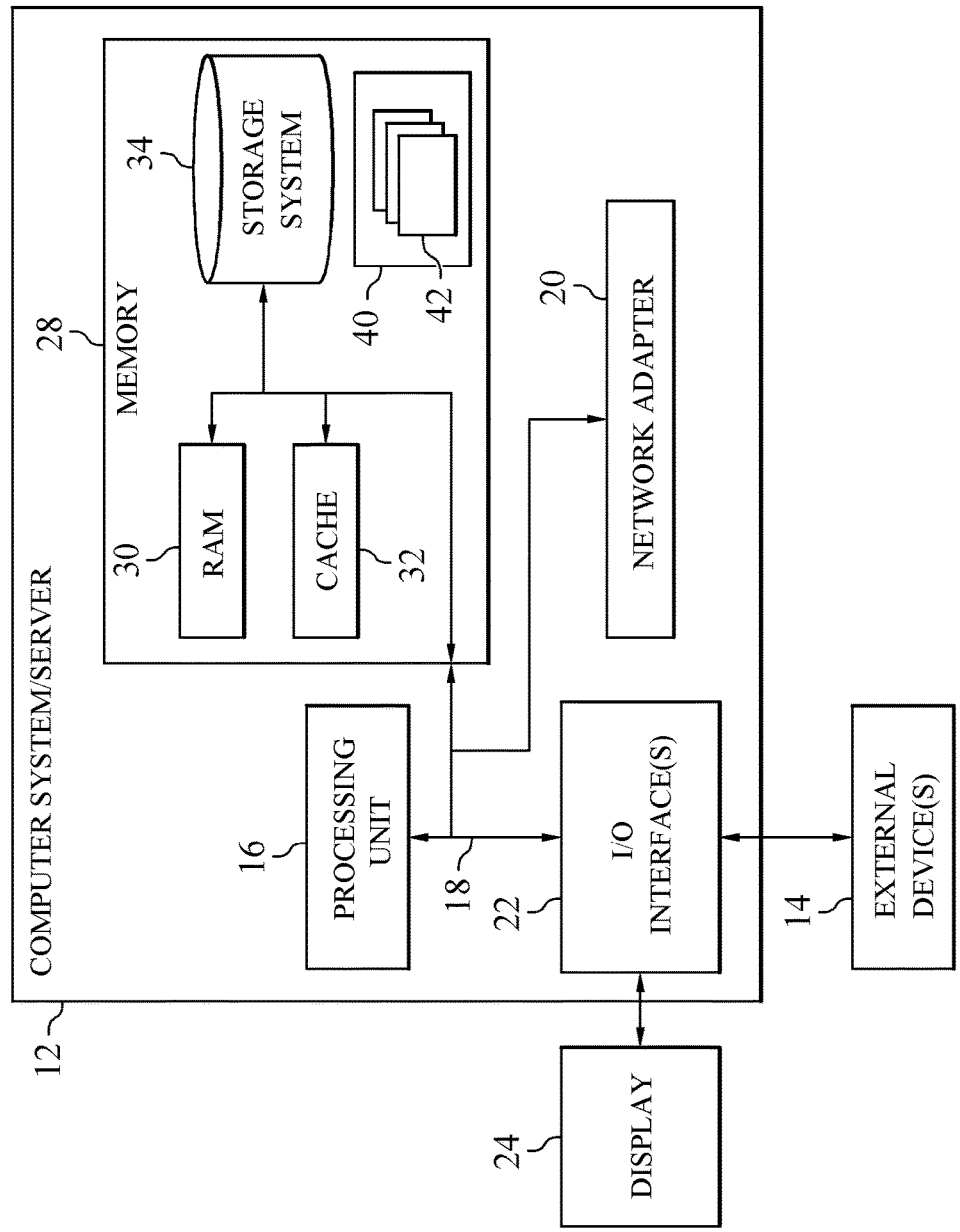
FIG. 1 depicts a cloud computing node, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Some embodiments will be described in more detail with reference to the accompanying drawings, in which the embodiments of the present disclosure have been illustrated. However, embodiments of the present disclosure can be implemented in various manners, and thus should not be construed to be limited to the embodiments disclosed herein.

It can be understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and may exist on-premises or off-premises.

Community cloud: the cloud infrastructure is shared by several organizations and supports a specific community that has shared concerns (e.g., mission, security requirements, policy, and compliance considerations). It can be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example cloud computing node 10 is depicted. The node depicted is only one example of a suitable cloud computing node and is not intended to suggest any limitation as to the scope of use or functionality of embodiments of the disclosure described herein. Regardless, the cloud computing node 10 is capable of being implemented and/or performing any of the functionality set forth hereinabove.

In a cloud computing node 10 there is a computer system/server 12 or a portable electronic device such as a communication device, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As depicted in FIG. 1, computer system/server 12 in the cloud computing node 10 is illustrated in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not depicted and typically called a "hard drive"). Although not depicted, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set of at least one of program module(s) 42, can be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It can be understood that although not depicted, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
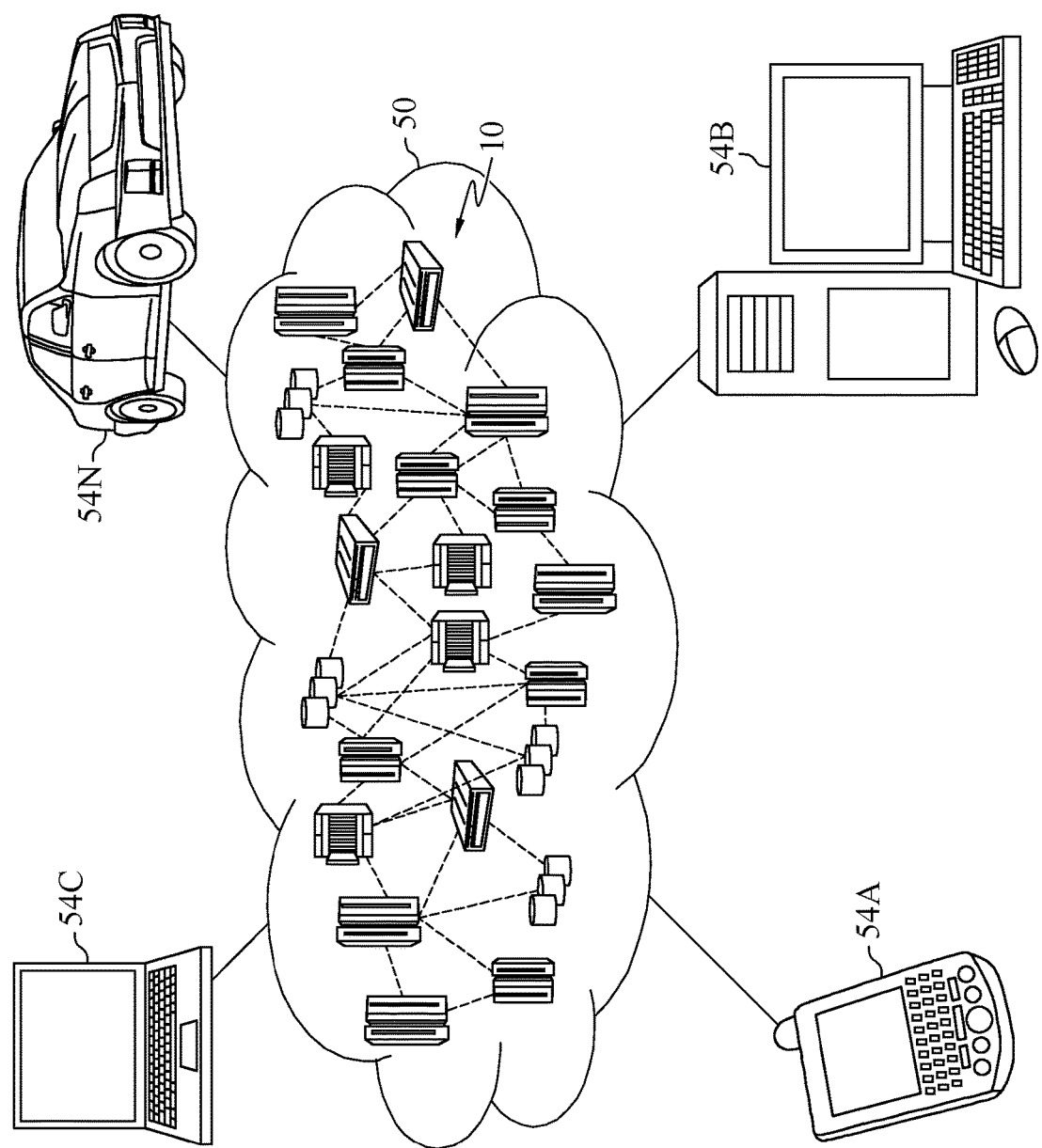
FIG. 2 depicts a cloud computing environment, according to embodiments consistent with the figures.

Referring now to FIG. 2, an illustrative cloud computing environment 50 is depicted. As depicted, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They can be grouped (not depicted) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It can be understood that the types of computing devices 54A-N depicted in FIG. 2 are intended to be illustrative only and that computing nodes 10 and cloud computing environment 50 can communicate with any type of computerized device over any type of network and/or network addressable connection (e.g., using a web browser).

Figure 3:
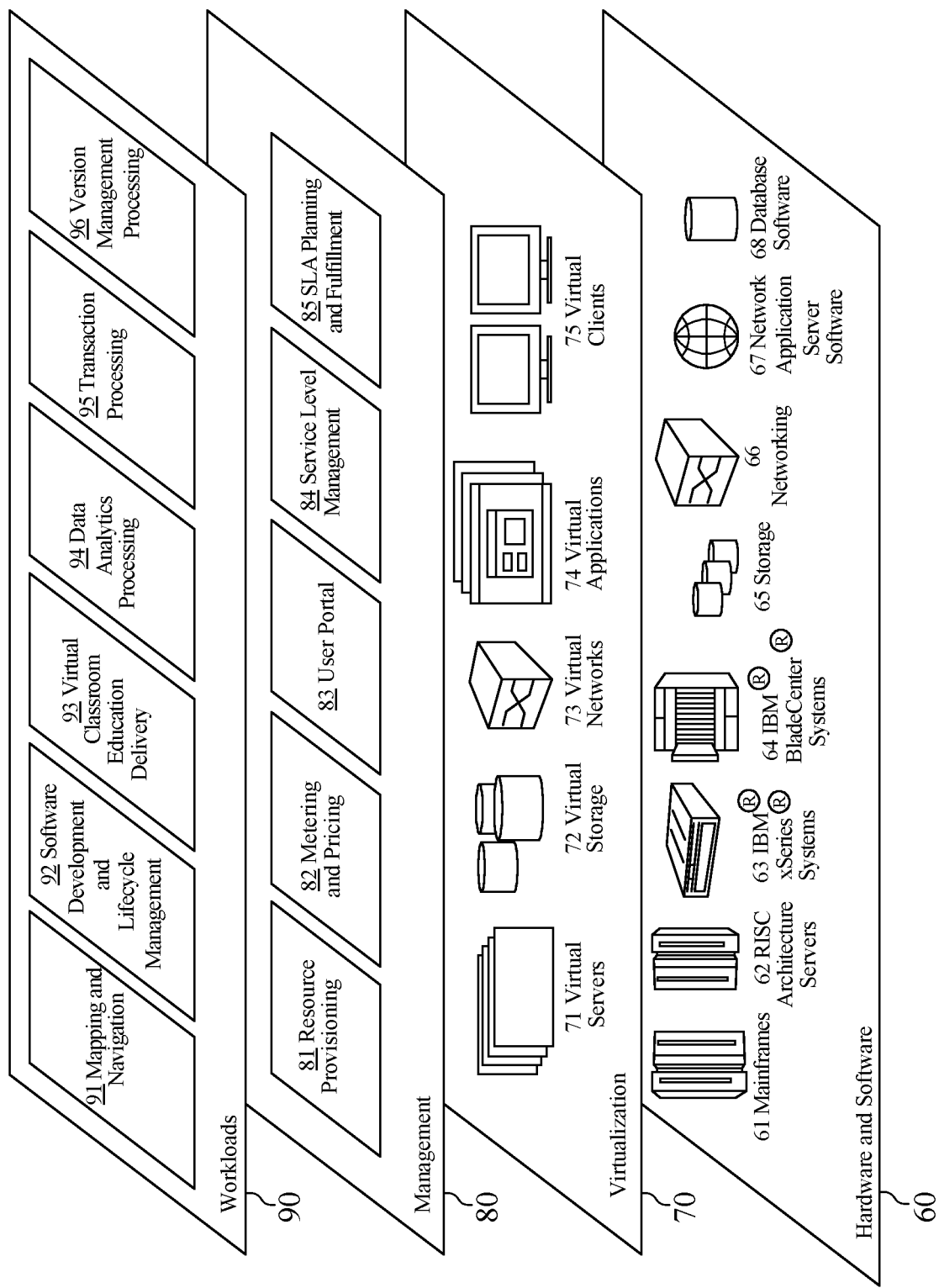
FIG. 3 depicts abstraction model layers, according to embodiments consistent with the figures.

Referring now to FIG. 3, a set of functional abstraction layers provided by cloud computing environment 50 (FIG. 2) is depicted. It can be understood in advance that the components, layers, and functions depicted in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and version management processing 96. Hereinafter, see FIGS. 4 to 11 to describe details of the version management processing 96.

Figure 4:
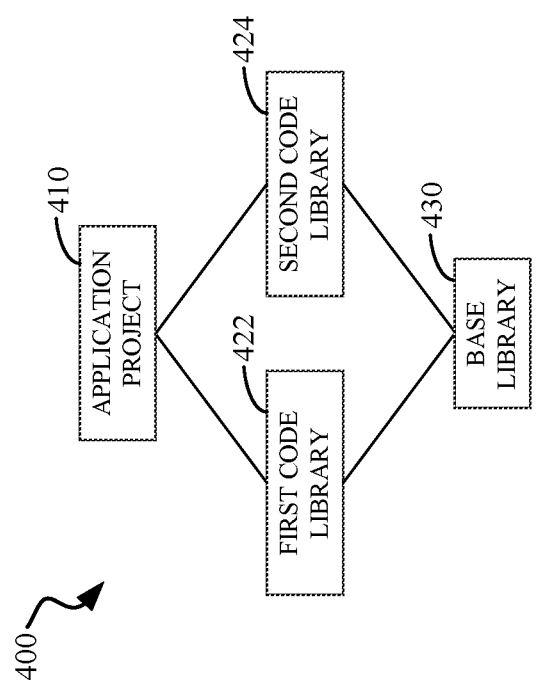
FIG. 4 depicts an example diagram for a dependency relationship between code libraries that are referred to in an application project, according to embodiments consistent with the figures.

FIG. 4 depicts an example diagram 400 illustrating a dependency relationship between libraries that are referred to in an application project 410 according to embodiments. In FIG. 4, an application project 410 may refer to a first code library 422 and a second code library 424. Here, the application project 410 can be implemented by any programming language, for example, the C language, the C++ language, the Java language, and the like. Here, the application project 410 may include one or more files, in which the first code library 422 and the second code library 424 are referred to. As depicted, the first code library 422 and the second code library 424 may further refer to a base library 430. Providers of the code libraries can update and add new objects into their code libraries, and each of the code libraries 422, 424 and 430 can have multiple versions. Different versions of code libraries 422 and 424 may refer different versions of the base library 430. Managing various versions of these code libraries can become a problem.

Detailed information will be presented to describe the above situation. For example, the application project 410 can be a Java project developed by an engineer, the first code library 422 can be Apache Twill that allows distributed capabilities with a programming model, and the second library 424 can be a Cassandra Java Driver that supports data storage. Further, the base library 430 can be Guava on which both of Apache Twill and Cassandra Java Driver can be based. The engineer may use a version of Apache Twill which is based on Guava 13.0.1 and a version of Cassandra Java Driver which is based on Guava 16.0.1. Therefore, a potential version conflict may occur within the application project 410.

Various technical solutions have been proposed for implementing version management. In one technical solution, the version dependency can be maintained manually by engineers. Such manual tasks may result in significant expenditures of time and effort. Moreover, this solution may only work for relatively simple application projects that employ only a few code libraries. Often, dozens or more code libraries can be involved in a complicated project, and thus this solution may not be feasible. In another technical solution, all the engineers can be required to use libraries with the latest versions. However, new versions can be released during the development of the application project 410, and then this technical solution may not be very efficient. Therefore, the task of managing versions of code libraries in a simpler and more efficient manner remains a significant technical problem.

Figure 5:
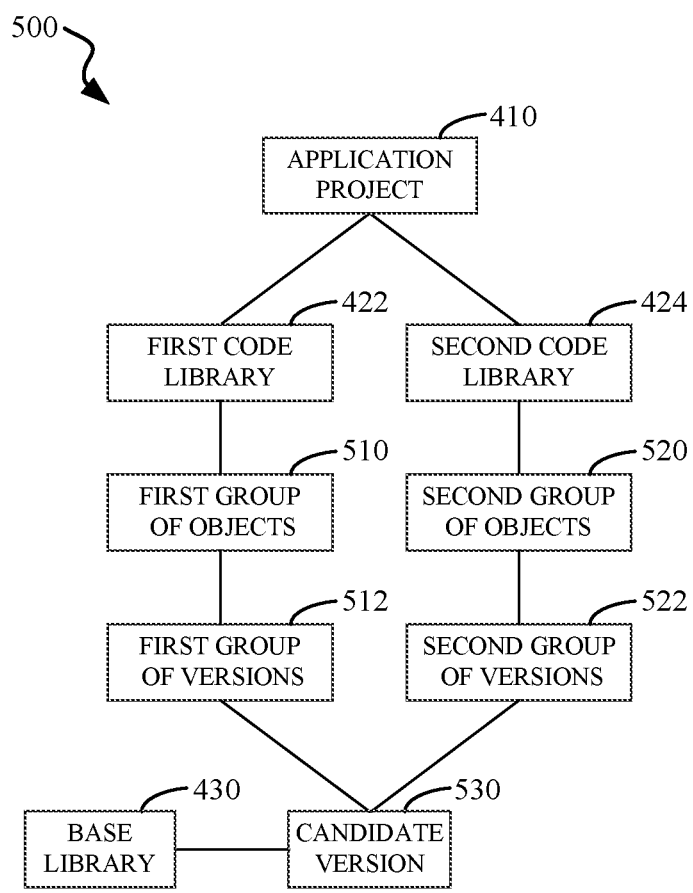
FIG. 5 depicts an example diagram for managing versions of a base library of an application project, according to embodiments consistent with the figures.

In order to at least partially solve the above-described problem and other potential problems, a new method for version management is disclosed according to embodiments of the present disclosure. Hereinafter, see FIG. 5 for a general description of the present disclosure. FIG. 5 depicts a diagram 500 depicting a structure that for managing versions of the base library 430 of the application project 410, according to embodiments. As depicted in FIG. 5, a first group 510 of objects that are called in the first code library 422 can be obtained. Here, the first code library 422 is referred to in the application project 410, and the objects here may have a broader meaning and may include any of data that is included in the application project 410. For example, the objects may include a class, a method, a field, an annotation, and the like. The first group 510 of objects are defined in one or more versions of the base library 430. Further, a first set 512 of versions of the base library 410 can be determined, where the first group 510 of objects can be defined in the first set 512 of versions of the base library 430.

The right branch of FIG. 5 is similar to the left branch, where a second group 520 of objects that are called in the second code library 424 can be obtained. Similarly, the second code library 424 can be referred to in the application project 410, and the second group 520 of objects can be defined in one or more versions of the base library 430. A second set 522 of versions of the base library 410 in which the second group 520 of objects are defined can be determined.

Further, based on the first set 512 of versions and the second set 522 versions of the base library 430, a candidate version 530 of the base library 430 can be determined for being referred to in the application project 410. With the above embodiment, a candidate version 530 that supports both of the first code library 422 and the second code library 424 and ensure a correct operation of the application project 410 can be identified automatically, without manual effort or intervention.

Figure 6:
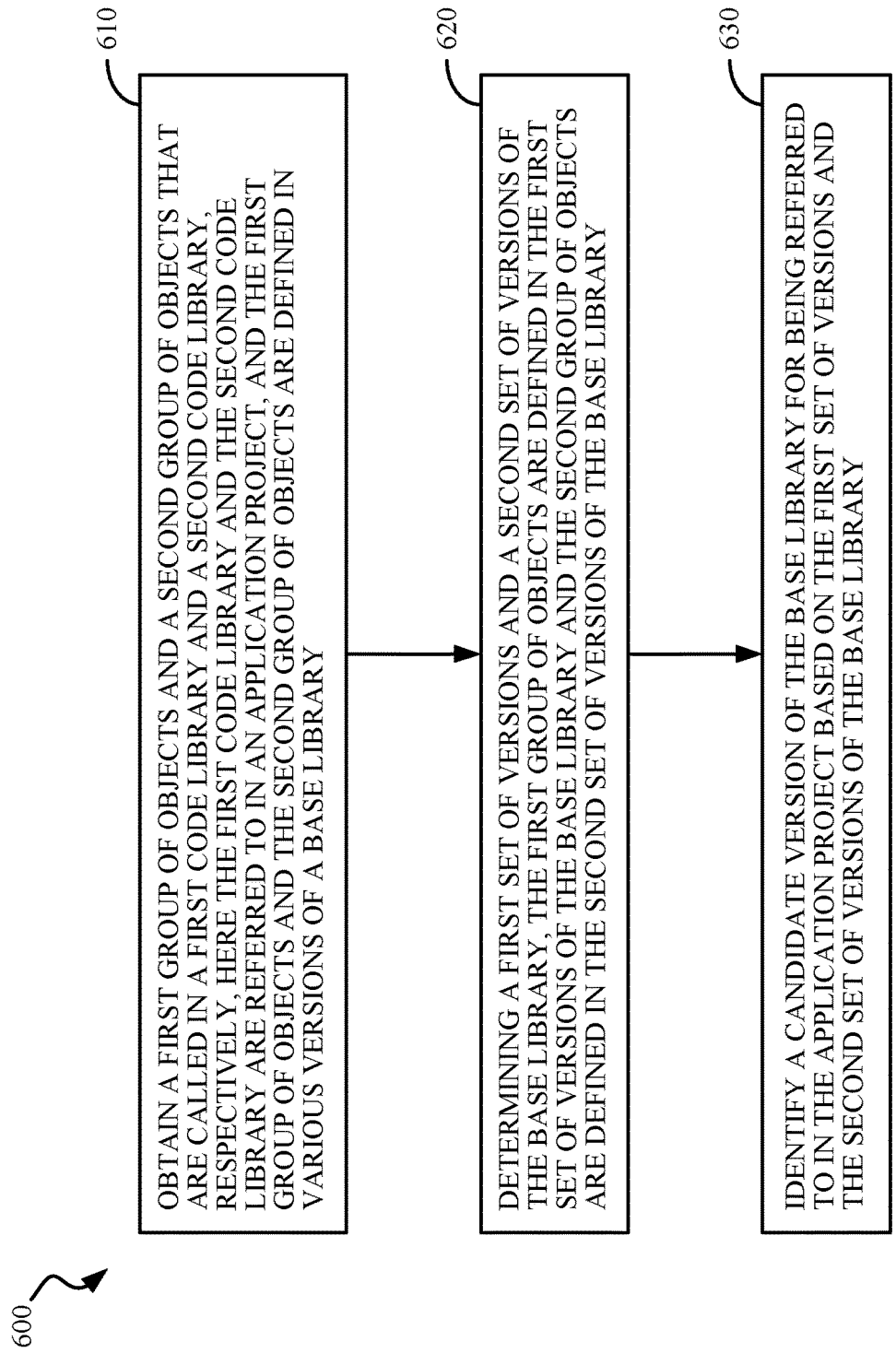
FIG. 6 depicts an example flow diagram of a method for managing versions of a base library of an application project, according to embodiments consistent with the figures.

FIG. 6 depicts an example flow diagram of a method 600 for managing versions of the base library 430 of the application project 410 according to embodiments. At a block 610, the first group 510 of objects and the second group 520 of objects, that are called in the first code library 422 and the second code library 424, can be obtained, respectively. The first code library 422 and the second code library 424 are referred to in the application project 410, and the first group 510 of objects and the second group 520 of objects are defined in multiple versions of the base library 430.

In order to obtain the first group 510 of objects, a first version of the first code library 422 can be first determined. According to embodiments, the first version can be obtained from a dependency definition in a configuration of the application project 410. See FIG. 7 for details. FIG. 7 depicts an example diagram 700 for a configuration 710 of the application project 410 according to embodiments. Although the configuration 710 in FIG. 7 is defined in the XML (eXtensible Markup Language) format, in some embodiments, it can be defined in another type of data structure. Referring to FIG. 7, the dependency definition 720 can define code libraries that are referred to in the application project 410. According to FIG. 7, the first version is "3.8.1," at this point, the first code library 422 with the version "3.8.1" can be obtained.

Once the first code library 422 is obtained, the code library 422 can be analyzed to obtain the first group 510 of objects. According to embodiments, the first group 510 of objects can be determined by analyzing source code or bytecodes of the first code library 422. For some open source code, the source code of the code libraries are open to the public and thus the source code can be obtained and analyzed for determining the group of objects that are defined in the source code. At this point, the source code can be scanned to find which objects, as defined in the base library 430, are called in the source code.

Often, providers of the code libraries do not publish the source code and only provide the bytecodes. At this point, the bytecodes can be scanned to find the group of objects. There are several tools for reading detailed information from the bytecodes. For example, ASM provides Java bytecode manipulation and analysis tools, and it can be used to read existing information directly in binary format from the bytecodes. See FIGS. 8A and 8B for details.

FIG. 8A depicts an example block diagram 800A of a fragment of bytecodes related to a class from which a group of basic objects can be obtained, according to embodiments. FIG. 8A depicts some basic objects that are defined in the base library 430. As depicted in a block 810A, "Modifiers" and "name" of the class can be determined by using "ClassVisitor.visit( )" provided in ASM, "Field*" as depicted in a block 820A can be determined by using "ClassVisitor.visitField( ), and "Method*" as depicted in a block 830A can be determined by using "ClassVisitor.visitMethod( )."

FIG. 8B depicts an example block diagram 800B of a fragment of bytecodes related to a class from which a group of advanced objects can be obtained according to embodiments. FIG. 8B depicts some advanced objects that are defined in the base library 430. As depicted in a block 810B, "super class" and "interfaces" of the class can be determined by using "ClassVisitor.visit( )" provided in ASM, "Annotation*" as depicted in a block 820B can be determined by using "ClassVisitor.visitAnnotation( ), "Type*" as depicted in a block 830B can be determined by using "ClassVisitor.visitField( )," "Annotation*" in "Field*" as depicted in a block 840B can be determined by using "ClassVisitor.visitAnnotation( )," "return and parameter types*" in "Method*" as depicted in a block 850B can be determined by using "ClassVisitor.visitMethod( )," "Annotation*" in "Method*" as depicted in a block 860B can be determined by using "ClassVisitor.visitAnnotation( )," and "Complied code*" in "Method*" as depicted in a block 870B can be determined by using various method such as "ClassVisitor.visitFieldInsn( )" and "ClassVisitor.visitMethodInsn( )."

Based on the above, all the objects that are defined in the code library can be determined. Further, a comparison can be made between the determined objects and objects that are defined in the base library 430 to obtain the group of objects. It can be understood that the above procedure can be implemented for the first code library 422 and the second code library 424 so as to obtain the first group 510 of objects and the second group 520 of objects, respectively. With this embodiment, each and every object that is called in the first code library 422 and is defined in the base library 430 can be added into the first group 510 of objects. The processing for the second code library 424 is similar and details will be omitted hereinafter.

Returning to FIG. 6, at a block 620, the first set 512 of versions and the second set 522 of versions of the base library can be determined. Here, the first group 510 of objects are defined in the first set 512 of versions of the base library 430, and the second group 520 of objects are defined in the second set 522 of versions of the base library 430. According to embodiments, all versions that support the first code library 422 and the second code library 424 can be obtained.

According to embodiments, multiple versions of the base library 430 can be determined. Often, the provider of the library maintains a serial of versions from the oldest one to the latest one for their library. For example, a portion of or all of the versions can be obtained from an official website of the provider of the base library 430. By this way, multiple versions of the base library 430 can be obtained. Further, each of these versions can be analyzed to see if the version can support the first code library 422. With respect to a given version in multiple versions of the base library 430, if all of the first group of objects are defined in the given version of the base library, it shows that the given version supports the first code library 422 and then the given version can be added into the first set 512 of versions.

Hereinafter, details about how to determine whether a given version of the base library 430 can support the first code library 422 or not. First, the given version of the base library 430 can be scanned to find all objects that are defined in the base library 430. Then, the first group 510 of objects can be compared with the found objects. If all objects in the first group 510 are included in the found objects, it can be determined that the given version can support the first code library 422 and then the given version can be added into the first set 512 of versions. Further, the similar procedure can be implemented for the second code library 424 to determine the second set 522 of versions of the base library 430, and details will be omitted.

Referring to FIG. 6, based on the first set 512 of versions and the second set 522 of versions of the base library 430, a candidate version 530 of the base library 430 can be identified at a block 630 for being referred to in the application project 410. According to embodiments, in order to identify the candidate version 530, an overlap can be determined between the first set 512 of versions and the second set 522 of versions of the base library 430. Next, the candidate version 530 can be selected from the overlap if the overlap is not empty. Here, the overlap is an intersection of the first set 512 and the second set 522, and each version in the overlap can support both of the first code library 422 and the second code library 424. At this point, any version in the overlap can be identified as the candidate version 530.

Figure 9:
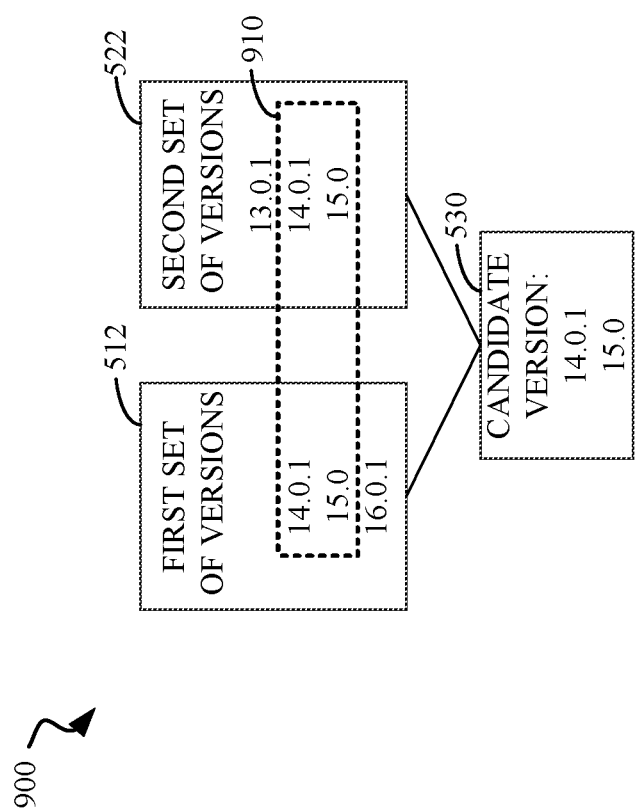
FIG. 9 depicts an example block diagram for identifying a candidate version of the base library, according to embodiments consistent with the figures.

Details will be described with reference to FIG. 9, which depicts an example block diagram 900 for identifying the candidate version 530 of the base library 430, according to embodiments. Referring to the first set 512 of versions, the first set 512 includes three versions of the base library 430: 14.0.1, 15.0 and 16.0.1. Referring to the second set 522 of versions, the second set 522 includes three versions of the base library 430: 13.0.1, 14.0.1, and 15.0. As indicated by a block 910, the overlap between the first set 512 and the second set 522 includes two versions: 14.0.1 and 15.0. At this point, any of the above two versions can be identified as the candidate version 530 of the base library 430.

The above paragraphs have described how to determine the candidate version 530 when the overlap between the first set 512 and the second set 522 is not empty. However, sometimes the overlap can be empty. In other words, this situation shows that there is no base library that can support both of the first code library 422 and the second code library 424 at the same time. According to embodiments, there is provided a method for find a candidate version of the base library even if the overlap is empty.

It can be understood that, often only a certain percentage of, but not all, objects defined in the first code library 422 are called in the application project 410, and in some cases, the percentage can be lower than 10%. At this point, the codes of the application project 410 can be analyzed to find what objects in the first code library 422 and the second code library 424 are called in the application project 410. See FIG. 10 for details.

Figure 10:
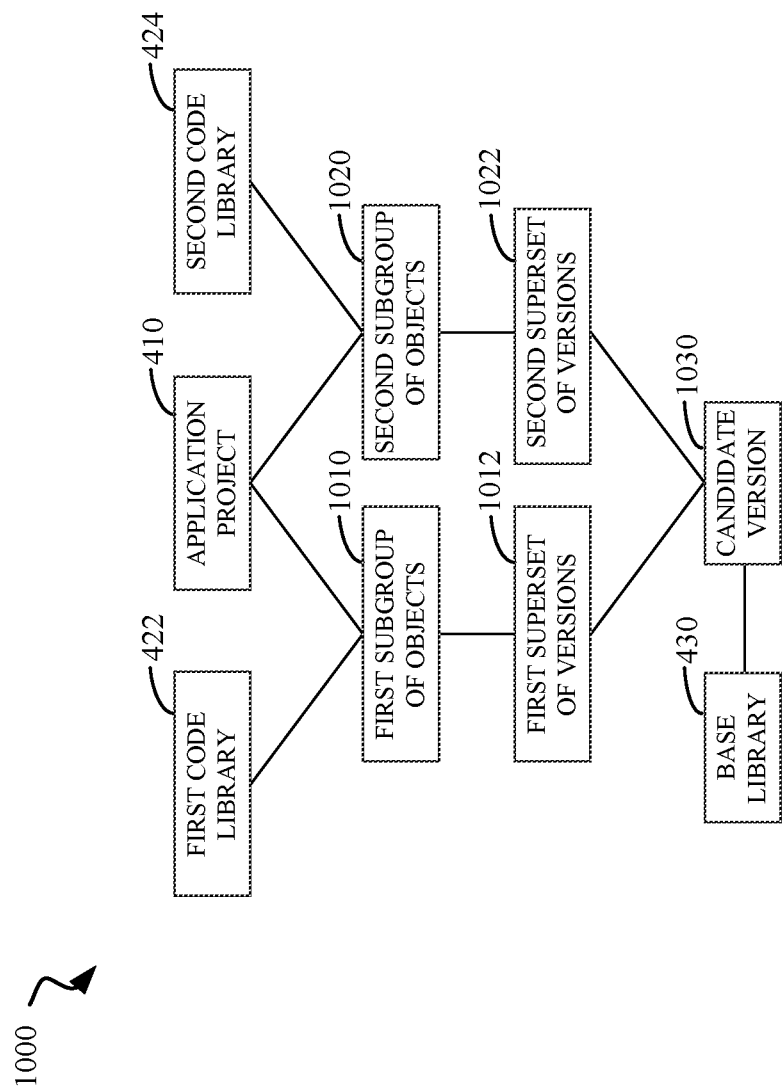
FIG. 10 depicts an example diagram for managing versions of a base library of an application project, according to embodiments consistent with the figures.

FIG. 10 depicts an example diagram 410 for managing versions of the base library 430 of the application project 410 according to embodiments. For ease of illustration and discussion, only the left branch for processing the first code library 422 is described; similar procedures can be implemented for the second code library 424 in the right branch. According to embodiments, codes of the application project 410 can be scanned to obtain a first subgroup 1010 of objects that are called in the application project 410, and the first subgroup 1010 here is included in the first group 510. With this manner, the size of the first subgroup 1010 can be much small than that of the first group 510. Further, a first superset 1012 of versions the base library 430 can be determined, and the first subgroup 1010 of objects here are defined in the first superset 1012 of versions of the base library 430. In this way, more versions of the base library 430 can be found.

Meanwhile, the application project 410 can be subjected to similar procedures as those performed on the left branch, so as to obtain the second superset 1022 of versions. Next, if an overlap between the first superset 1012 and the second superset 1022 is not empty, a candidate version 1030 of the base library 430 can be identified from the overlap. Here, the candidate version 1030 can be referred to in the application project 410. With this embodiment, as the first superset 1012 and the second superset 1022 include more versions than the first set 512 and the second set 522, respectively, there can be a higher possibility that the overlap is not empty. At this point, even if no base library supports both of the first code library 422 and the second code library 424 at the same time, the candidate version 1030 of base library 430 ensuring a correct operation of the application project 410 can be found.

According to embodiments, if the overlap between the first superset 1012 and the second superset 1022 is empty, then a notification can be provided to indicate that there is a conflict for the application project 410 between versions of the first code library 422 and the second code library 424. Based on this notification, the engineer can be notified that no base library 430 can support the correct operation of the application project 410. According to embodiments, the notification may prevent the engineer from seeking an answer to an unsolved problem.

According to embodiments, the notification may include further information about the conflict. For example, a difference can be determined between the first subgroup 1010 and the second subgroup 1020, and then the determined difference can be added into the notification and provided to the engineer. In a simple example, the application project 410 may call, via the first code library 422, an object O1 defined in the oldest version V1.0 of the base library 430. Meanwhile, the application project 410 may also call, via the second code library 424, an object O2 defined in the latest version V15.0 of the base library 430. In this example, the notification can be: "There is a conflict for calling the Object O1 in V1.0 and the Object O2 in V15.0 in the application project." With this embodiment, the notification may help the engineer to resolve an abnormal situation flagged in the debugging procedure.

According to embodiments, the configuration of the application project 410 can be updated to show other versions of the first code library 422 that may ensure the correct operation of the application 410. In this embodiment, at least one version of the first code library 422 can be added into the configuration of the application project 410. Here, the first subgroup 1010 of objects are defined in the at least one version of the first code library 410. In a similar manner, the configuration of the application project 410 can be updated to show other versions of the second code library 424 that may ensure the correct operation of the application 410. See FIG. 11 for details.

FIG. 11 depicts an example diagram for a configuration 1100 that is modified, according to embodiments. In FIG. 11, the configuration 1100 is updated from the configuration 710 in FIG. 7, where a line 1130 is added into the dependency portion 1120. As depicted in the line 1130, versions such as 3.7, 3.8, 3.8.1, 3.8.2, and 4.0 can be added into the configuration 1110 with a keyword "runWith" to indicate that these versions of the first code library "junit" can support the correct operation of the application project 410. With this embodiment, more options can be provided to the engineer.

Although the above paragraphs describe how to manage the version of the code libraries by taking the base library 430 referred to by two code libraries as an example, in another embodiment, the application project 410 may refer to two or more code libraries, in turn the two or more code libraries may call objects defined in one or more base libraries.

Although the above paragraphs describe embodiments where the objects called in the first code library 422 and second code library 424 are directly defined in the base library 430, in other embodiments, the objects can be indirectly defined in other base libraries. Based on the above description, those skilled in the art may work out how to determine a candidate version of the other base libraries.

The present disclosure can be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flow diagram illustrations and/or block diagrams of methods, apparatus/systems, and computer program products according to embodiments of the disclosure. It can be understood that each block of the flow diagram illustrations and/or block diagrams, and combinations of blocks in the flow diagram illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flow diagram and/or block diagram block or blocks.

The computer-readable program instructions may also be loaded onto a computer, other programmable data processing apparatus, or other device to cause a series of operations to be performed on the computer, other programmable apparatus or other device to produce a computer-implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible embodiments of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining a first group of code objects and a second group of code objects that are called in a first code library and in a second code library, respectively, the first code library and the second code library referred to in an application project, and the first group of code objects and the second group of code objects defined in multiple versions of a base library, wherein the obtaining a first group of code objects includes analyzing bytecodes of the first code library;
   determining a first set of versions and a second set of versions of the base library, the first group of code objects defined in the first set of versions of the base library and the second group of code objects defined in the second set of versions of the base library;
   identifying a candidate version of the base library for being referred to in the application project based on the first set of versions and the second set of versions of the base library, where the identifying includes:

determining an overlap between the first set of versions of the base library and the second set of versions of the base library; and identifying, in response to the overlap being non-empty, the candidate version from the overlap; and obtaining, in response to the overlap being empty, a first subgroup of code objects and a second subgroup of code objects that are called in the application project, respectively, the first subgroup included in the first group and the second subgroup included in the second group;

determining a first superset of versions of the base library and a second superset of versions of the base library, the first subgroup of code objects defined in the first superset of versions of the base library, and the second subgroup of code objects defined in the second superset of versions of the base library; and identifying, from an overlap between the first superset and the second superset, in response to the overlap being non-empty, a candidate version of the base library for being referred to in the application project.

2. The method of claim 1, further comprising:
detecting, from a dependency definition in a configuration of the application project, a first version of the first code library, the dependency definition defining code libraries that are referred to in the application project; and
obtaining, based on the first version, the first code library.

3. The method of claim 2, wherein the obtaining a first group of code objects includes analyzing an item selected from the group consisting of: bytecodes of the first code library, and source code of the first code library.

4. The method of claim 1, wherein the determining a first set of versions of the base library includes adding, with respect to a given version in multiple versions of the base library, the given version into the first set in response to all of the first group code objects being defined in the given version of the base library.

5. The method of claim 1, further comprising:
providing, in response to the overlap between the first superset and the second superset being empty, a notification indicating that there is a conflict for the application project between versions of the first code library and of the second code library.

6. The method of claim 5, wherein the providing of the notification includes:
determining a difference between the first subgroup and the second subgroup; and
providing, based on the determined difference, the notification.

7. The method of claim 1, further comprising adding at least one version of the first code library into a configuration of the application project, the first subgroup of code objects defined in the at least one version of the first code library.

8. An electronic system, the electronic system including a computer processor coupled to a non-transitory computer-readable memory unit, the memory unit comprising instructions that when executed by the computer processor implement a method, the method comprising:
obtaining a first group of code objects and a second group of code objects that are called, respectively, in a first code library and a second code library, the first code library and the second code library referred to in an application project, and the first group of code objects and the second group of code objects defined in multiple versions of a base library, wherein the obtaining a first group of code objects includes analyzing bytecodes of the first code library;

determining a first set of versions and a second set of versions of the base library, the first group of code objects defined in the first set of versions of the base library and the second group of code objects defined in the second set of versions of the base library; and identifying, based on the first set of versions and the second set of versions of the base library, a candidate version of the base library for being referred to in the application project, wherein the identifying includes:
determining an overlap between the first set of versions and the second set of versions of the base library; and
identifying the candidate version from the overlap in response to the overlap being non-empty; and obtaining, in response to the overlap being empty, a first subgroup of code objects and a second subgroup of code objects that are called in the application project respectively, the first subgroup included in the first group and the second subgroup included in the second group;

determining a first superset of versions and a second superset of versions of the base library, the first subgroup of code objects defined in the first superset of versions of the base library, and the second subgroup of code objects defined in the second superset of versions of the base library; and identifying, from an overlap between the first superset and the second superset, in response to the overlap being non-empty, a candidate version of the base library for being referred to in the application project.

9. The electronic system of claim 8, wherein the method further comprises:
detecting, from a dependency definition in a configuration of the application project, a first version of the first code library, the dependency definition defining code libraries that are referred to in the application project; and
obtaining the first code library based on the first version.

10. The electronic system of claim 9, wherein the obtaining a first group of code objects includes analyzing an item selected from the group consisting of: bytecodes of the first code library, and source code of the first code library.

11. The electronic system of claim 8, wherein the determining a first set of versions of the base library includes adding, with respect to a given version in multiple versions of the base library, the given version into the first set in response to all of the first group of code objects being defined in the given version of the base library.

12. The electronic system of claim 8, wherein the method further comprises:
providing, in response to the overlap between the first superset and the second superset being empty, a notification for indicating that a conflict for the application project between versions of the first code library and versions of the second code library.

13. The electronic system of claim 12, wherein the providing of the notification includes:
determining a difference between the first subgroup and the second subgroup; and
providing, based on the determined difference, the notification.

14. The electronic system of claim 8, wherein the method further comprises:
adding at least one version of the first code library into a configuration of the application project, the first subgroup of code objects defined in the at least one version of the first code library.

15. A computer program product, the computer program product comprising a computer-readable non-transitory storage medium having program instructions embodied therewith, the program instructions executable by an computer processor circuit to cause the computer processor circuit to perform a method, the method comprising:

obtaining a first group of code objects and a second group of code objects that are called, respectively, in a first code library and in a second code library, the first code library and the second code library being referred to in an application project, and the first group of code objects and the second group of code objects defined in multiple versions of a base library, wherein the obtaining a first group of code objects includes analyzing bytecodes of the first code library;

determining a first set of versions and a second set of versions of the base library, the first group of code objects defined in the first set of versions of the base library and the second group of code objects defined in the second set of versions of the base library; and identifying, based on the first set of versions and the second set of versions of the base library, a candidate version of the base library for being referred to in the application project, wherein the identifying includes:

determining an overlap between the first set of versions and the second set of versions of the base library; and identifying the candidate version from the overlap in response to the overlap being non-empty; and obtaining, in response to the overlap being empty, a first subgroup of code objects and a second subgroup of code objects that are called in the application project respectively, the first subgroup included in the first group and the second subgroup included in the second group;

determining a first superset of versions and a second superset of versions of the base library, the first subgroup of code objects defined in the first superset of versions of the base library, and the second subgroup of code objects defined in the second superset of versions of the base library; and identifying, from an overlap between the first superset and the second superset, in response to the overlap being non-empty, a candidate version of the base library for being referred to in the application project.

* * * * *